United States Patent [19]

Lish

[11] Patent Number: 4,866,645

[45] Date of Patent: Sep. 12, 1989

[54] NEURAL NETWORK WITH DYNAMIC REFRESH CAPABILITY

[75] Inventor: Charles A. Lish, Yorktown Heights, N.Y.

[73] Assignee: North American Philips Corporation, New York, N.Y.

[21] Appl. No.: 137,111

[22] Filed: Dec. 23, 1987

[51] Int. Cl.$^4$ ............................................. G06F 15/46
[52] U.S. Cl. .................................. 364/602; 364/131; 307/201
[58] Field of Search ............... 364/602, 513, 131, 807, 364/800, 133, 600; 357/30, 2; 307/201

[56] References Cited

U.S. PATENT DOCUMENTS

| | | | |
|---|---|---|---|
| 4,660,166 | 4/1987 | Hopfield | 364/807 |
| 4,731,747 | 3/1988 | Denker | 364/807 |
| 4,737,929 | 4/1988 | Denker | 369/807 |
| 4,752,906 | 6/1988 | Kleinfeld | 364/807 |
| 4,755,963 | 7/1988 | Denker | 364/807 |
| 4,760,437 | 7/1988 | Denker et al. | 357/30 |

OTHER PUBLICATIONS

Y. Tsividis & S. Satyanarayana, "Analogue Circuits for Variable-Synapse Electronic Neural Networks", *Electronics Letters*, Nov. 19, 1987, pp. 1313-1314.

*Primary Examiner*—Jerry Smith
*Assistant Examiner*—Charles B. Meyer
*Attorney, Agent, or Firm*—Bernard Franzblau

[57] ABSTRACT

An analog neural network composed of an array of capacitors for storing weighted electric charges. Electric charges, or voltages, on the capacitors control the impedance (resistance) values of a corresponding plurality of MOSFETs which selectively couple input signals to one input of a summing amplifier. A plurality of semiconductor gating elements (e.g. MOSFETs) selectively couple to the capacitor's weighted analog voltage values received serially over an input line. The weighted voltage on the input line are periodically applied to the proper capacitors in the neural network via the gating elements so as to refresh the weighted electric charges on the capacitors, and at a multiplex rate that maintains the voltages on the capacitors within acceptable tolerance levels.

16 Claims, 2 Drawing Sheets

NEURAL NETWORK WITH DYNAMIC REFRESH CAPABILITY

BACKGROUND OF THE INVENTION

This invention relates to the field of computing by means of artificial neural networks and useful in such applications as signal processing, filtering and image and speech pattern recognition. More particularly, the invention relates to an analog neural network composed of an array of capacitors storing weighted voltage values and provided with an improved dynamic refresh capability for the weighted electric charges on the capacitors.

Artificial neural networks (nets) have been studied for many years in an attempt to achieve performance levels approaching that of humans, especially in such fields as speech and image recognition. These networks are composed of many non-linear computational elements operating in parallel and arranged in patterns that attempt to simulate biological neural networks. These computational elements are connected via weights that are usually adapted or modified during operation to improve performance. Further background information related to the field of artificial neural nets can be found in the article by Richard P. Lippmann, "An Introduction to Computing With Neural Nets", in the IEEE ASSP Magazine, April, 1987.

Neural networks are capable of exploring many competing hypotheses simultaneously using voluminous parallel nets composed of many computational elements connected by links with variable weights. The computational elements (nodes) are generally non-linear and are typically analog devices. The simplest node sums N weighted inputs and passes the result on through a non-linear device. Algorithms used with neural networks may adapt connection weights in time so as to improve system performance based on present results. Adaptation or learning ability is an important feature of these networks.

A serious problem with a neural net composed of an array of capacitors with individual weighted charges stored thereon is that the charges leak off the capacitors and thereby create erroneous weighting factors. In order to overcome this drawback, it has been proposed to operate the apparatus in an enclosed super cooled environment (e.g. in a Dewar filled with liquid nitrogen) so as to minimize the leakage of charge from the capacitors of the neural network. Another suggestion was to use very large capacitors so as to maintain the capacitor charge or voltage for longer periods of time. The disadvantages of these solutions are apparent.

SUMMARY OF THE INVENTION

It is therefore an object of this invention to provide a new and improved neural network that avoids the drawbacks in the earlier proposed solutions to the capacitor charge leakage problems.

Another object of the invention is to provide an analog neural network having apparatus for dynamically refreshing the weighted data stored in the capacitors of the network.

In accordance with the invention, an improved analog neural network is provided that includes an array of capacitors each of which is charged to a weighted voltage value and each of which has its charge refreshed by periodically coupling the capacitors to a source of weighted voltages via semiconductor gating elements associated with respective individual ones of the capacitors. The weighted voltages on the capacitors control the resistance values of a set of MOSFETs which have their gate electrodes individually connected to respective ones of the capacitors.

The invention makes it possible to provide a neural network which uses smaller capacitors than previously proposed and does not require mounting same in a super-cooled housing. The neural net is more compact and efficient than those proposed by others in the art.

BRIEF DESCRIPTION OF THE DRAWINGS

The invention will now be described in greater detail with reference to the accompanying drawing in which.

DESCRIPTION OF THE ILLUSTRATIVE EMBODIMENTS

Figure 1:
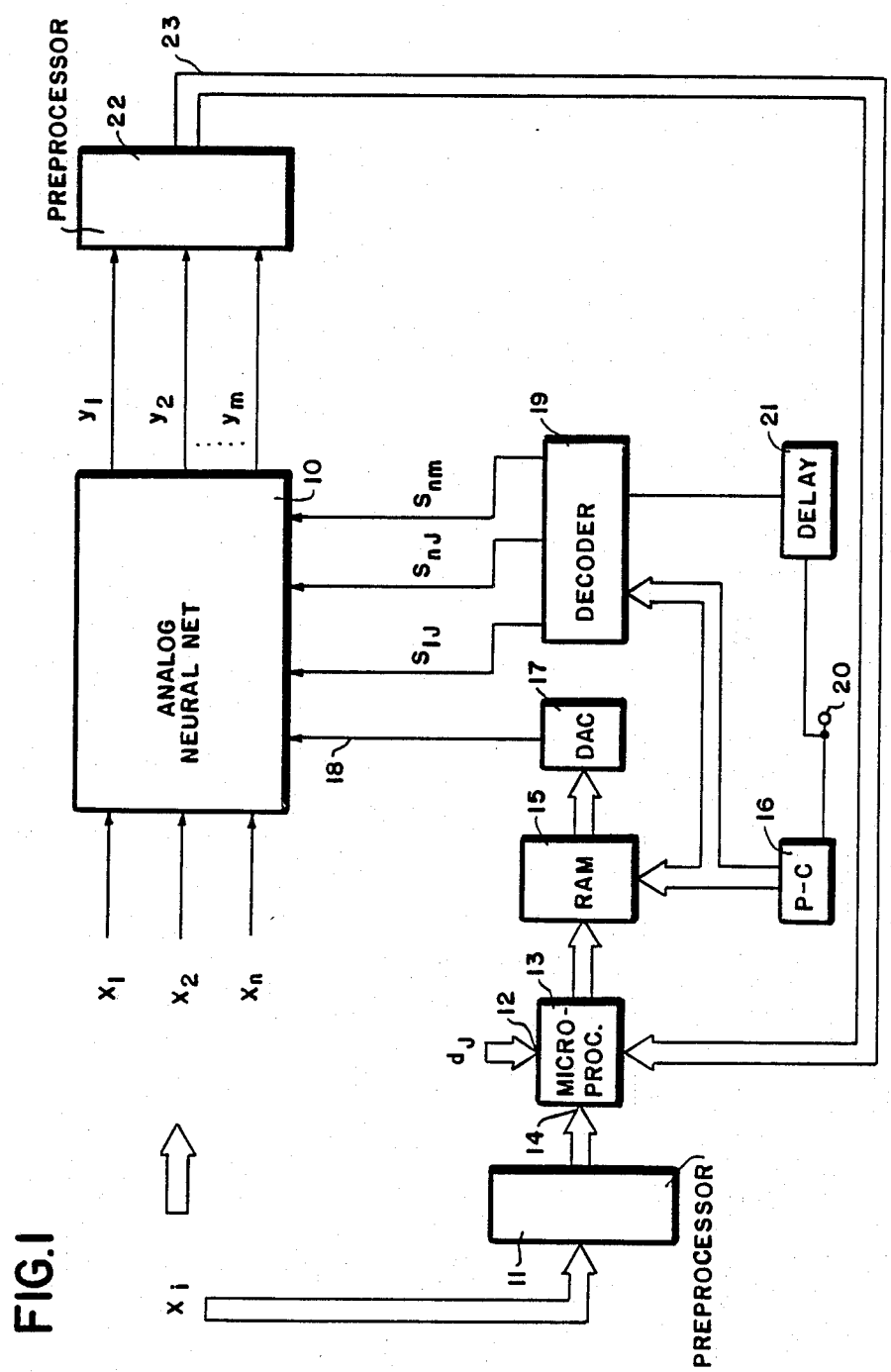
FIG. 1 shows the invention as part of an adaptive system that could be used for the purpose of speech pattern recognition, and FIG. 2 partially illustrates the inventive details of the analog neural network of FIG. 1.

The invention will first be described as it may be used in one exemplary system, shown in FIG. 1, for example as part of a speech recognition apparatus. An analog neural network 10, to be described in greater detail below, has a plurality of input lines $x_1, x_2 \ldots x_n$, etc. for receiving input data $x_i$ (where i=1,n). The invention will be described in connection with a single layer example of the network 10, but it is clearly also applicable to multi-layer neural networks.

The analog neural net portion of the system receives the x values, which may have analog or digital values depending on the network algorithm. In the learning phase of the system, a set of training patterns each having a set of input values ($x_i$) is pattern sequentially applied in parallel groups to the input lines $x_1, x_2 \ldots x_n$ of the neural net 10 and to the input of a preprocessor 11. In addition, a set of target values $d_j$, where j=1,m is pattern sequentially applied to a first set of inputs 12 of a microprocessor 13 along with actual network outputs $y_j$ (j=1,m) converted to readable digital form by preprocessor 22 and applied to the microprocessor via lines 23. The microprocessor also receives at a second set of inputs 14 the $x_i$ values which were first converted into readable digital form by the preprocessor 11.

The weighting information or data is stored in a RAM 15 which, under the control of a recyclable program counter 16, reads out the "weight" data to a digital/analog converter 17. The DAC 17 in turn serially supplies the "weight" data to an array of capacitors (not shown) in the analog neural network 10 via an output line 18.

The program counter 16 simultaneously advances a decoder 19 which, via the output lines $S_{1j}, S_{2j} \ldots S_{nj} \ldots S_{nm}$ sequentially energizes an array of switching MOSFETs (not shown) in the neural net 10 that in turn control the application of weighting voltages to the respective capacitors in the array of capacitors (not shown) in the neural network.

The weighting data for the capacitor array in neural net 10 is stored in RAM 15 and is simultaneously being updated by the microprocessor 13 as this data is read out of RAM 15 by the program counter 16. Thus, the weight data stored in RAM 15 is updated on the fly as this data is supplied to DAC 17 under the control of the program counter 16. A terminal 20 supplies clock pulses to the program counter 16 and to the decoder 19 via a delay device 21 that allows sufficient settling time for the DAC output voltage before the decoder strobes the switching MOSFETs.

The program counter, preferably a recyclable counter, reads out each address in RAM 15 to supply the weighting information to the neural net so as to refresh the weighted charges stored on the capacitors therein in a serial operation. The program counter simultaneously advances the decoder 19 which, in response, sequentially applies gating signals to its output lines $S_{1j}, S_{2j} \ldots S_{nj} \ldots S_{nm}$. These output lines are coupled to individual control electrodes of the semiconductor gating elements associated with individual ones of the capacitors in the neural network 10.

The weighted voltages applied to the capacitors from DAC 17 determine the resistance values of individual associated MOSFETs (not shown) in neural net 10. The program counter keeps recycling and supplying signals to address the RAM 15 and the decoder 19 so that the weighting data stored in the RAM, and which is being updated by the microprocessor 13, is continuously supplied to the capacitors in the neural net 10, via DAC 17. Thus, the weighted voltages on the capacitors are continuously refreshed and updated at a multiplex rate that is sufficient to maintain the voltages on the capacitors at the correct weighted values, as determined by the weighted data stored in RAM 15, i.e. within a tolerance determined by the charge leakage rate of the capacitors and the refresh interval.

At the start of a learning phase, the capacitors in the analog neural net have weighted voltages at some initial random values. After receiving the input values, the neural net will develop an output ($y_j$) on the output lines $y_1, y_2 \ldots y_m$. The y output values are applied to a preprocessor 22. The preprocessor 22 scans the analog output lines of the neural network and converts the data signals received into a series of digital numbers. These digital numbers are arranged in a format that is convenient to allow it to be read into the microprocessor via the data lines 23.

The digital y values supplied to the microprocessor 13 over the lines 23 are then compared in the microprocessor with the target values $d_j$ supplied over input lines 12. The microprocessor uses the input x values, along with the results of the comparison mentioned above, to calculate new weight values that are loaded into RAM 15, which in turn adjusts the weighted values in the analog neural net. This action is repeated sequentially for all of the patterns in the training set until the differences between all of the output values and the target values fall within a prespecified error tolerance. The network has now learned the pattern group.

To recapitulate, the microprocessor compares the output values of the y preprocessor (22) to the desired target values for a given training set having known input patterns. The weights are then adjusted so that the network output is more closely matched to the target values. This operation is repeated for different patterns in the training set until the network can respond to the complete pattern set within a specified error tolerance. The diagrams and descriptions are for a single layer net. However, in the case of a multi-layer network, a useful algorithm is the back propagation method of Rumelhart.

After the network has learned the pattern set under digital control, the net no longer has to interface with the digital processor sections and the learning algorithm software. The analog neural net is now essentially on its own under dynamic refresh and is now able to operate at the inherent high speed of analog, applying the learned patterns to old or new data sets. During this processing phase the network is not slowed down by the digital processing as it was during the learning phase.

In the processing phase, the learned weights are dynamically refreshed in the neural net and the digital learning hardware is not used. The dynamic refresh analog net now stands alone and is able to operate very rapidly classifying new input patterns according to the weighting information acquired during the learning phase.

Figure 2:
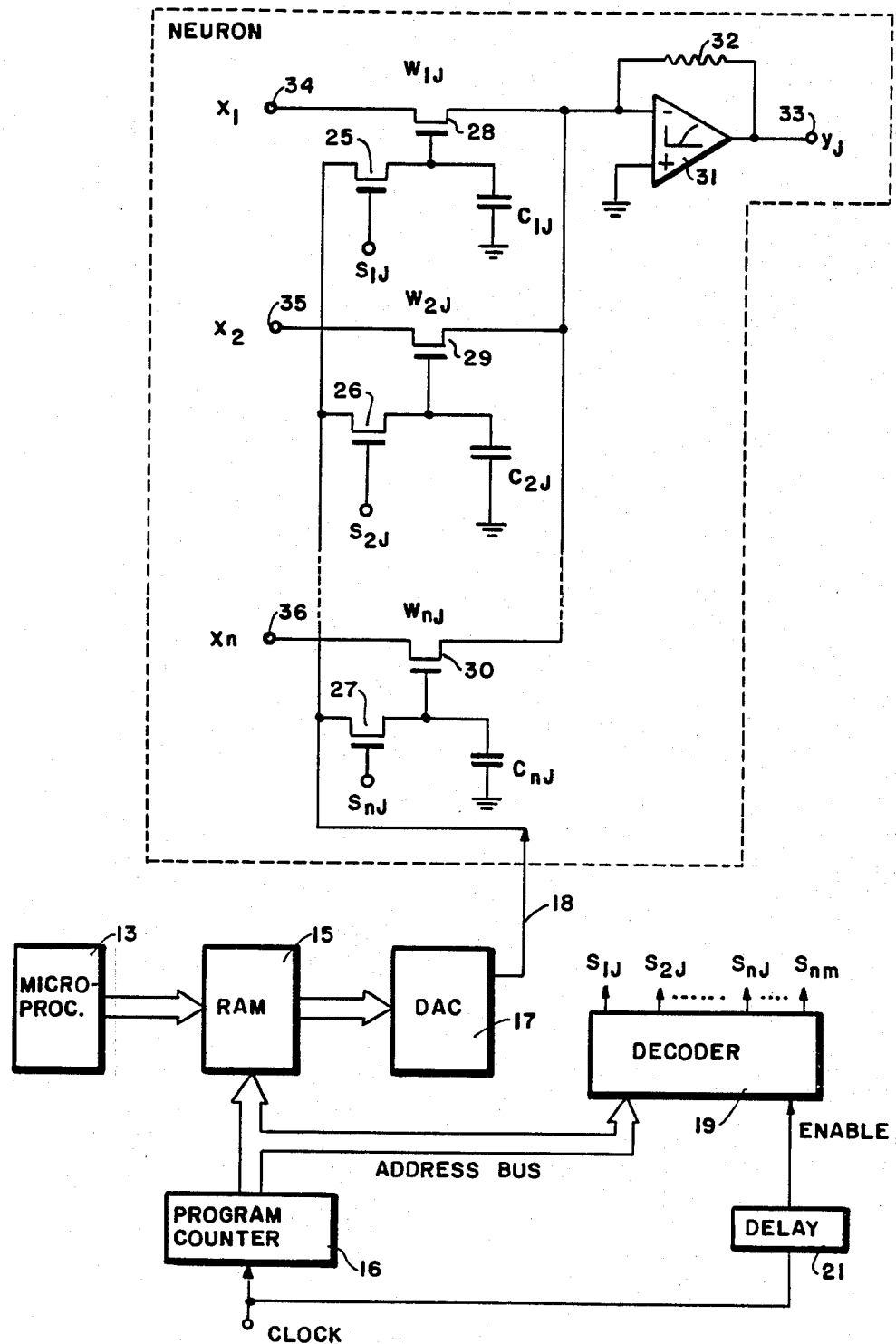

FIG. 2 shows some of the details of a portion of the neural network 10. This network includes an array of capacitors $C_{1j}, C_{2j} \ldots C_{nj}$ for storing weighted values as voltages corresponding to tap weights. Each of the capacitors shown is connected between ground and the output line 18 of the DAC 15 via respective semiconductor gating elements 25, 26 . . . 27. The semiconductor gating elements may be MOSFETs having the gate electrodes connected to respective output lines $S_{1j}, S_{2j} \ldots S_{nj}$ of the decoder 19. Each analog neural element also consists of a respective MOSFET 28, 29 . . . 30. The outputs of the m neural elements are $y_j$ where j=1,m.

The MOSFETs 28, 29 and 30 are connected between respective input lines $x_1, x_2$ and $x_n$ and the inverting input of an operational amplifier 31. The gate electrodes of MOSFETs 28, 29 and 30 are connected to respective junction points between capacitors $C_{1j}, C_{2j}$ and $C_{nj}$ and gating MOSFETs 25, 26 and 27. The MOSFETs 28–30 function as resistive weights wherein the resistive value of each resistive weight is controlled or determined by the applied gate voltage received from its respective capacitor $C_{1j}$–$C_{nj}$.

The op-amp 31 has its non-inverting (+) input connected to ground and has a feedback resistor 32, having a resistance value $R_f$, connected between its output and its inverting (−) input. The op-amp preferably is a relatively low gain amplifier that provides a sigmoidal function, as is common in many modern neural net systems. The output of op-amp 31 is connected to an output terminal 33 that supplies the $y_j$ (j=1,m) signals to the preprocessor 22 in FIG. 1.

The MOSFETs 28–30 are operated in the triode region and thereby function approximately as variable resistors each having a weighted resistance value determined by its gate voltage, which in turn is determined by the weighted voltage stored on its associated connected capacitors $C_{1j}$–$C_{nj}$. The input signals $x_1, x_2 \ldots x_n$ are supplied to input terminals 34, 35 . . . 36 and are modified by individual weighting factors as determined by the resistance values of the series arranged MOSFETs 28, 29 . . . 30, respectively. The op-amp, with the sigmoidal response characteristic, sums the weight modified input signals $x_i$.

The signal y at the output of op-amp 31 can be expressed as:

$$y_j = f\left[ x_1\left(\frac{R_f}{R_{1j}}\right) + x_2\left(\frac{R_f}{R_{2j}}\right) + \ldots x_n\left(\frac{R_f}{R_{nj}}\right) \right]$$

The ratio ($R_f/R_{1j}$) is the weighting factor $W_{1j}$ of the MOSFET 28, the ratio ($R_f/R_{2j}$) is the weighting factor $W_{2j}$ of the MOSFET 29, and so on. The ratios of the resistance $R_f$ to the respective resistance values $R_{ij}$ determines the weighting factors $W_{ij}$ applied to each of the respective input signals $x_i$. Resistance $R_f$ is the resistance value of the feedback resistor 32. The function f is an approximate sigmoid, but it may be any other desired function.

The weighted voltages are stored on the capacitors by strobing the $S_{ij}$ output lines of the decoder 19. The weighted data stored in the RAM 15 is addressed sequentially by the program counter 16 producing a series of analog voltage levels at the output line 18 of the DAC 17. At the same time, the program counter triggers the decoder 19 to cause each output line $S_{ij}$ to be energized sequentially, thereby sequentially turning on the gating MOSFETs 25–27 as their gate electrodes are energized in sequence.

Each time a gate MOSFET 25–27 turns on, a weighted analog voltage is passed from the RAM 15, via DAC 17 and line 18 to the associated capacitor $C_{ij}$, thus refreshing the weighted voltages stored on these capacitors. The correct analog voltages are routed sequentially to the proper capacitors. The program counter recycles continuously to refresh the weighted charges on the capacitors and at a rate to minimize the voltage drop on the capacitors between successive refresh periods, thereby maintaining the capacitor voltages within the error tolerance of the network. If necessary, standard linearization techniques can be used with the MOSFETs 28–30, such as the well-known balanced configuration using a dual input - dual output op-amp. This also provides the additional flexibility of creating excitation and inhibition (+ or −) inputs and outputs.

Although the invention has been described with reference to one preferred embodiment thereof, it will be obvious to those skilled in the art that various modifications can be made without departing from the true scope and intent of the invention, as described above. Dependent claims are intended to cover all such variations and modifications coming within the spirit and scope of the invention.

What I claim is:

1. A neural network comprising:
    a plurality of capacitors for storing weighted electric charges,
    an input terminal for receiving weighted voltages appearing in serial form,
    a plurality of controlled semiconductor gating elements coupling individual respective ones of said capacitors to said input terminal,
    a plurality of controlled semiconductor variable impedance elements having individual control terminals coupled respectively to individual ones of said capacitors, the impedance value of each of said variable impedance elements being determined by the voltage on its individually coupled capacitor,
    at least one summing amplifier having an input coupled to given ones of said variable impedance elements, said summing amplifier having an output coupled to an output of the neural network,
    a plurality of further input terminals for receiving input signals and coupled to individual ones of said variable impedance elements, and
    means coupled to control electrodes of said semiconductor gating elements for sequentially energizing the gating elements to refresh the weighted electric charges stored on the capacitors by means of the weighted voltages appearing at said input terminal.

2. A neural network as claimed in claim 1 wherein said controlled semiconductor variable impedance elements each comprise a MOS field effect transistor device having a gate electrode coupled to a junction point between its individual capacitor and the gating element individually coupled to said capacitor, each MOS field effect transistor device being connected between its individual further input terminal and the input of the summing amplifier.

3. A neural network as claimed in claim 1 wherein the summing amplifier comprises a low gain operational amplifier having a sigmoid response characteristic.

4. A neural network as claimed in claim 1 wherein said semiconductor gating elements each include a MOS field effect transistor device having a gate electrode coupled to said sequential energizing means.

5. A neural network as claimed in claim 1 further comprising:
    a microprocessor having first, second and third inputs for receiving, in digital form, said input signals, output signals from said network output, and target signals, respectively,
    a memory device for storing digital data corresponding to said weighted voltages, said memory device having a first input coupled to an output of the microprocessor and a second input coupled to an output of a counter,
    a digital/analog converter having input means coupled to an output of the memory device and an output coupled to said input terminal, and wherein
    said sequential energizing means includes a decoder having input means coupled to said output of the counter and a plurality of output lines coupled to individual ones of the control electrodes of said semiconductor gating elements.

6. A neural network as claimed in claim 1 wherein said summing amplifier further comprises a second input coupled to a reference potential 7. A neural network as claimed in claim 1 further comprising a memory device for storing digital data indicative of said weighted voltages, and wherein
    said sequential energizing means comprises a counter for addressing said memory device and a decoder coupled to an output of said counter for sequentially energizing the gating elements, said network further comprising
    a digital/analog converter coupled between said memory device and said input terminal.

8. A neural network as claimed in claim 7 further comprising data processing means for receiving said input signals, output signals from the neural network and target signals, said data processing means being responsive to the received signals thereby to supply further signals to said memory device for updating the digital data stored in the memory device as a function of said received signals.

9. A neural network as claimed in claim 1 wherein at least some of said variable impedance elements are individually coupled between respective ones of said further input terminals and said summing amplifier input.

10. A neural net comprising a plurality of interconnected active elements wherein a data-interconnection between each pair of interconnected elements comprises a voltage controlled impedance means whose impedance value is indicative of a weight of said interconnection, means connecting individual control terminals of said impedance means to respective capacitances via respective nodes, means coupling a conduction path of a respective transmission gate between said respective node and a further terminal which provides weight signals and which is common to at least a further plurality of said transmission gates, control means coupled to control terminals of said further plurality of transmission gates for sequentially enabling said transmission gates thereby to supply weight signals at said further terminal to respective ones of said capacitances for refreshing charges stored on the relevant capacitances.

11. A neural net as claimed in claim 10, wherein the control means comprises a memory for storing digital data indicative of the weights, a counter for cyclically addressing said memory, a digital/analog converter for converting digital data supplied by the memory into analog signals and for transmitting said analog signals to said further terminal, and a decoder coupled to said counter for sequentially enabling the relevant transmission gates.

12. A neural net as claimed in claim 11, wherein the counter is coupled to a clock signal input, and delay means coupled between said clock signal input and the decoder for applying delayed clock signals to said decoder.

13. A neural net as claimed in claim 11 wherein the neural net comprises input terminals for supplying the interconnected elements with internally generated input signals, output terminals for transmitting output signals which are a function of said input signals, and data processing means for receiving the input signals, the output signals and target signals for making a determination whether the relevant output signals comply with the relevant target signals and for updating the digital data stored in the memory as a function of said determination.

14. A neural net as claimed in claim 10, wherein each voltage controlled impedance means comprises a conduction channel of a field effect transistor.

15. A neural net as claimed in claim 14, wherein each transmission gate comprises a conduction channel of a field effect transistor.

16. A neural net as claimed in claim 10, wherein each active element comprises an amplifier.

* * * * *